(12) United States Patent
Keller et al.

(10) Patent No.: US 7,870,252 B2
(45) Date of Patent: Jan. 11, 2011

(54) SYSTEM AND METHOD FOR NETWORKING EDUCATIONAL EQUIPMENT

(75) Inventors: Neal Keller, Hawthorne, NY (US); Juhnyoung Lee, Yorktown Heights, NY (US); Clifford A. Pickover, Yorktown Heights, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 12/138,513

(22) Filed: Jun. 13, 2008

(65) Prior Publication Data

US 2008/0247321 A1  Oct. 9, 2008

Related U.S. Application Data

(63) Continuation of application No. 11/184,512, filed on Jul. 19, 2005, now abandoned.

(51) Int. Cl.
*G06F 15/173* (2006.01)
*G06F 15/177* (2006.01)
*G06F 9/00* (2006.01)

(52) U.S. Cl. .................. 709/224; 709/220; 713/100
(58) Field of Classification Search .................. None
See application file for complete search history.

(56) References Cited

U.S. PATENT DOCUMENTS 6,509,828 B2 * 1/2003 Bolavage et al. ........... 340/10.1
7,092,987 B2 * 8/2006 Brittingham et al. ........ 709/203
2002/0138370 A1 * 9/2002 Dan et al. .................... 705/27
2005/0091174 A1 * 4/2005 Akkiraju et al. ............. 705/75

\* cited by examiner

*Primary Examiner*—John B. Walsh
(74) *Attorney, Agent, or Firm*—Scully, Scott, Murphy & Presser, P.C.; Daniel P. Morris, Esq.

(57) ABSTRACT

A system, method and computer program product for monitoring availability of end user devices needed for performing tasks. The system comprises a first network including one or more devices associated with an end user, at least one device adapted for communicating with a service provider over a second network, the service provider providing network-based services in the system. The system includes a memory storage device for maintaining information of tasks associated with an end user, the information including recommended end-user devices adapted to perform the tasks, the information being accessible to at least one end-user device. At least one end-user device detects non-availability or performance deficiencies of any end-user device required in performing end-user tasks, and communicates with the service provider for invoking network-based services to facilitate correcting non-availability of any end-user device. Such a system, method and computer program product enables students to receive these reminders and alerts, to order the necessary upgrades from suppliers via web services, and to monitor delivery from a single user interface provided on one of their devices.

26 Claims, 13 Drawing Sheets

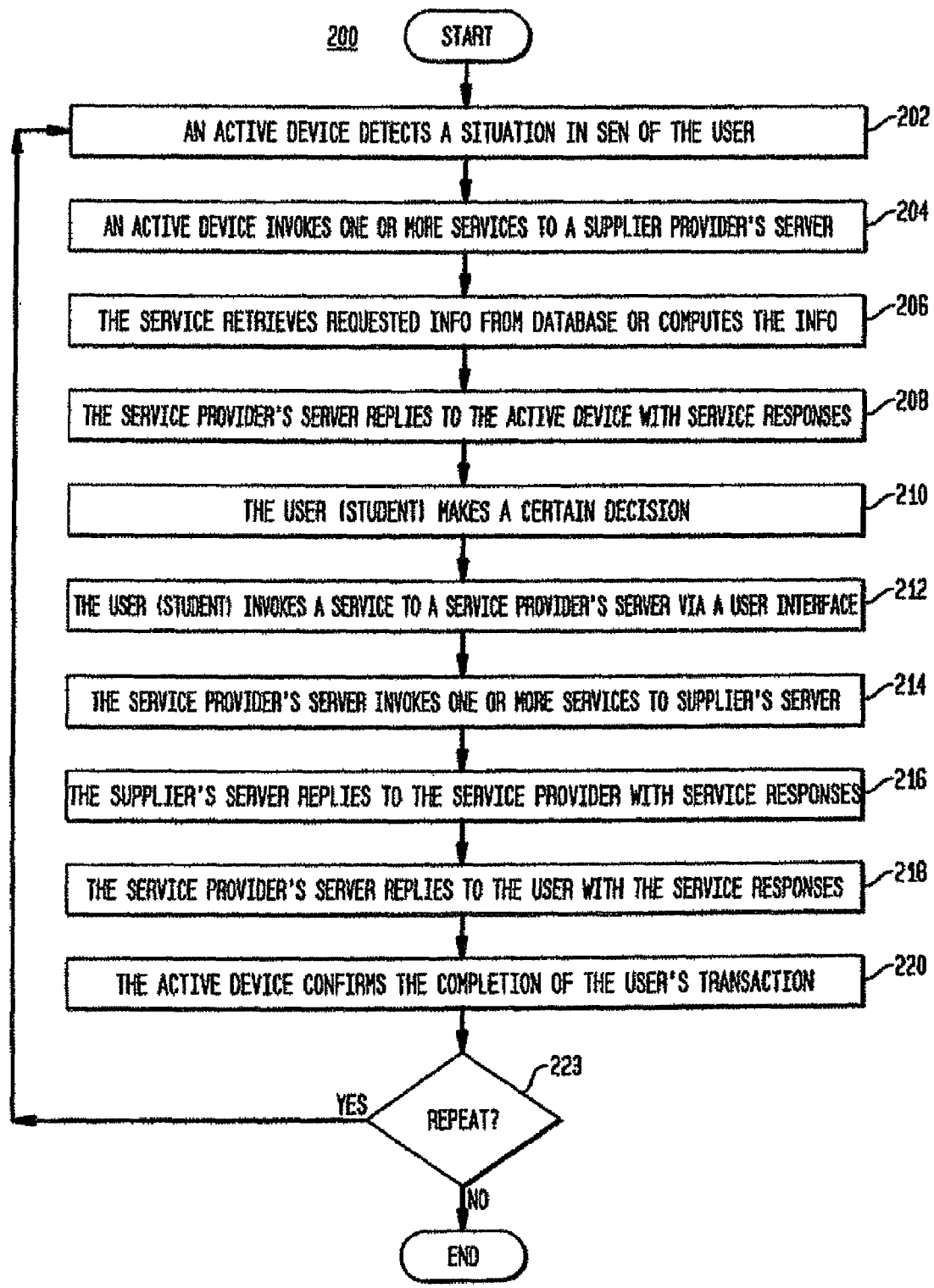

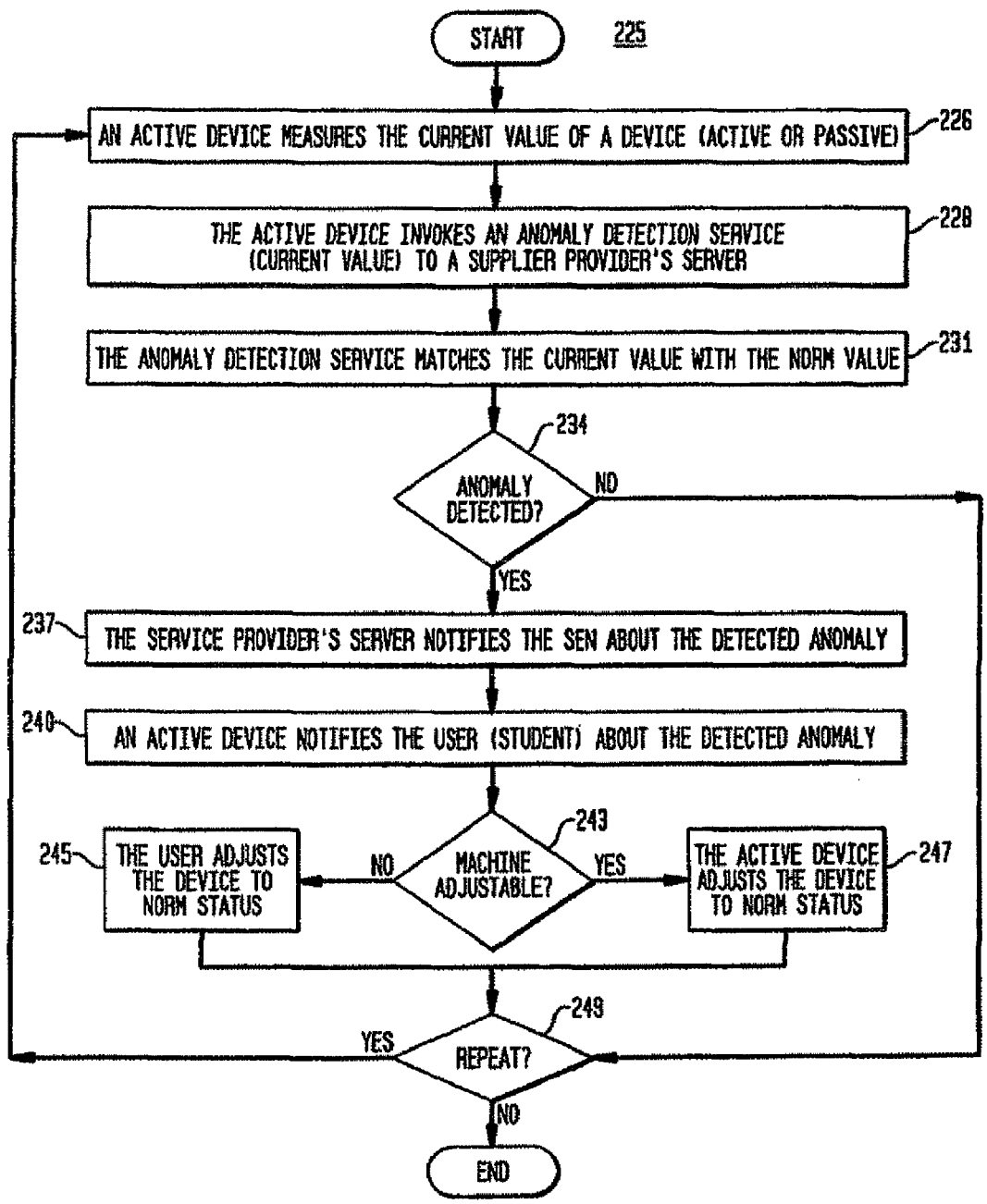

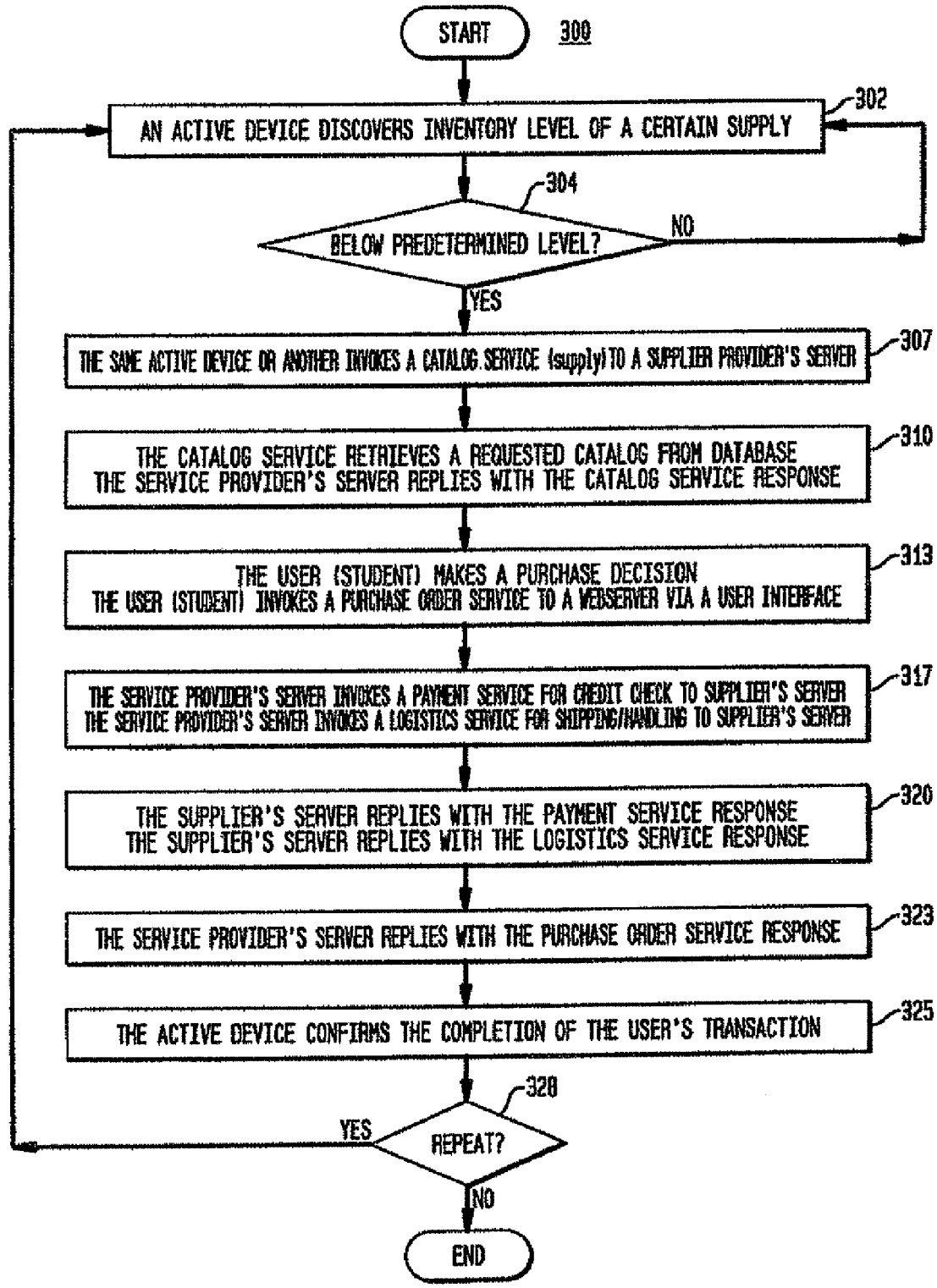

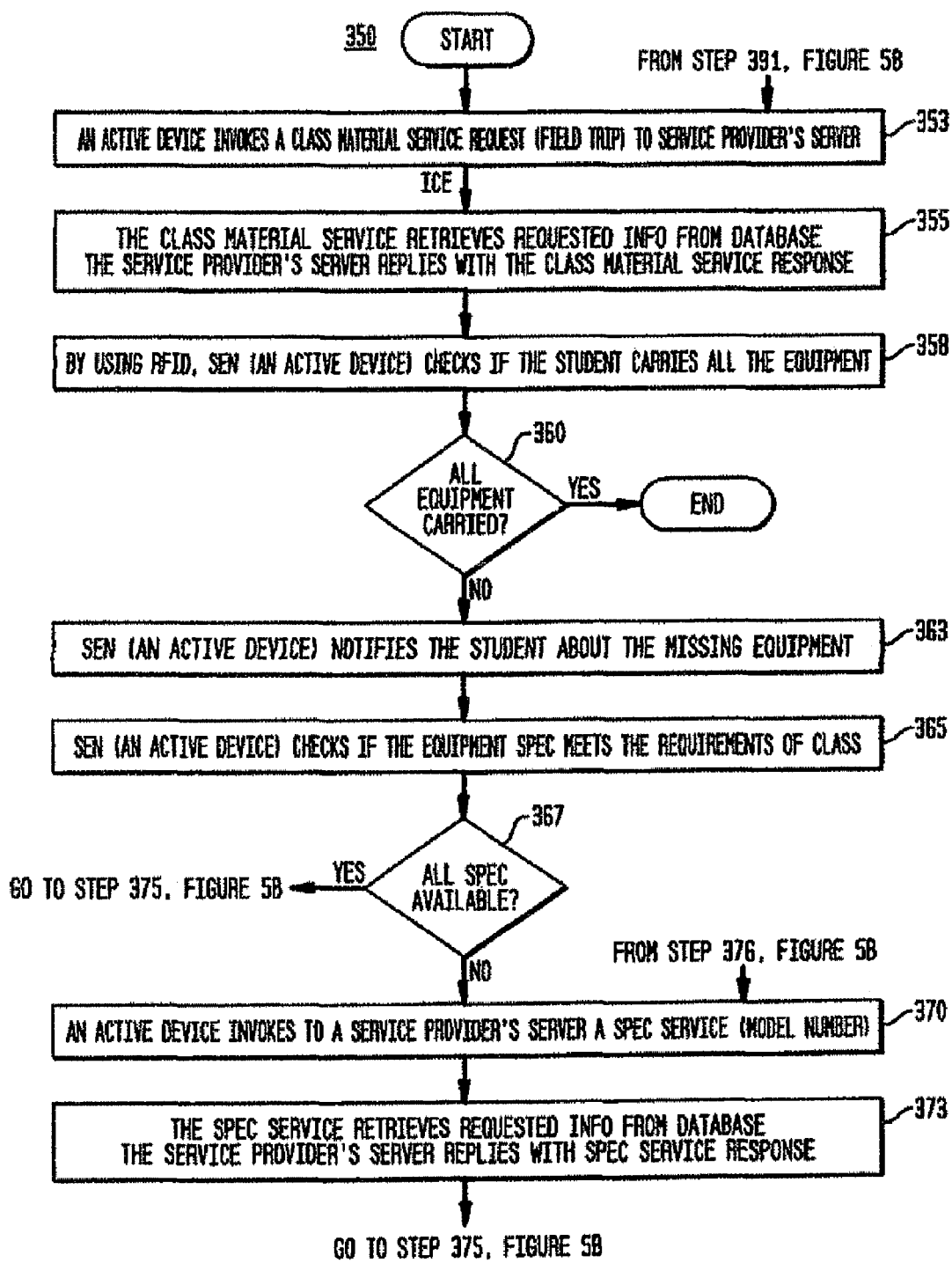

| CLASS TITLE 403 | ENROLLED STUDENTS 405 | ASSIGNMENT 407 | DUE DATE 409 | PERFORMANCE CRITERIA 411 | RECOMMENDED EQUIPMENT 413 |
|---|---|---|---|---|---|
| MATH I | JOHN SMITH, BILL ACER, HARRY WILLS | CALCULATE INTEREST ON HOME MORTGAGE | 2/2/05 | | • CALCULATOR WITH FINANCIAL FUNCTIONS |
| ENGLISH I | SALLY JONES, JOHN SMITH, BETTY HILLER | ESSAY ON SHAKESPEARE'S LIFE | 2/10/05 | 1000 < 2000 WORDS | • PC WITH WORD PROCESSING<br>• INTERNET CONNECTION |
| EARTH SCIENCE | BETTY HILLER, BILL ACER, JOHN SMITH | FIELD TRIP TO ENVIRONMENTAL CENTER TO STUDY IMPACT OF FOREIGN PLANT LIFE | 3/1/05 | DRAWING OF POND SHOWING AREAS TAKEN OVER BY FOREIGN PLANT LIFE. CLOSEUP PHOTOGRAPHS FOREIGN PLANT LIFE. TYPED REPORT INCLUDES SUMMARY OF CHAPTER THREE IN TEXTBOOK, DIGITAL PHOTOGRAPHY AND POND DRAWING IN TIFF FORMAT SUBMITTED AS EMAIL ATTACHMENTS WITH TEXT OF REPORT. | • EXPLORATIONS IN EARTH SCIENCE TEXTBOOK CHAPTER 3<br>• SKETCH PAD<br>• CAMERA |

| STUDENT NAME 453 | ENROLLED CLASSES 457 | CURRENT SEN CONFIGURATION 459 | NOTIFICATION CHANNEL 461 | PRIVACY NOTIFICATION CHANNEL 463 |
|---|---|---|---|---|
| JOHN SMITH | MATH 1, ENGLISH 1, EARTH SCIENCE | • DELL NOTEBOOK MODEL 123<br>• NOKIA CELL PHONE MODEL 456<br>• TEXAS INSTRUMENTS CALCULATOR MODEL 789<br>• PROTRACTOR<br>• SKETCH PAD | INSTANT MESSAGING | EMAIL |
| BILL ACER | MATH 1, EARTH SCIENCE | • APPLE NOTEBOOK MODEL ABC<br>• SAMSUNG CELL PHONE MODEL OBZ<br>• TEXAS INSTRUMENTS CALCULATOR MODEL 451 | PHONE CALL | EMAIL |
| BETTY HILLER | ENGLISH 1, EARTH SCIENCE | • IBM NOTEBOOK MODEL 231<br>• SONY CELL PHONE MODEL BRS<br>• DIGITAL CAMERA<br>• MOTOROLA CELL PHONE MODEL ORS | INSTANT MESSAGING | EMAIL |

| STUDENT NAME 480 | TASK 483 | DATE FINISHED 485 | ELAPSED TIME 487 | TIME vs. STUDENT MEAN 489 | SUPPLIES USED 490 | SUPPLIES vs. STUDENT MEAN 493 |
|---|---|---|---|---|---|---|
| JOHN SMITH | • CALCULATE INTEREST ON HOME MORTGAGE<br>• SHAKESPEARE ESSAY<br>• POND SKETCH FOR FIELD TRIP | • 2/2/05<br>• 2/11/05<br>• 2/25 | • 150 SECONDS<br>• 9 HOURS<br>• 3 HOURS | • BETTER<br>• MUCH WORSE<br>• MUCH WORSE | • N/A<br>• N/A<br>• 20 PAGES OF PAPER | • N/A<br>• N/A<br>• MUCH WORSE |
| BILL ACER | | | | | | |
| BETTY KILLER | | | | | | |

FIG. 10

Student Name _John Smith_ Current Date: 01/29/05      150

Normal Notification Channel: X Instant Messaging _Phone Call _Email— 187
Privacy Notification Channel:_ Instant Messaging _Phone Call X Email— 188

CURRENT SEN EQUIPMENT: DELL NOTEBOOK MODEL 123, NOKIA CELL PHONE MODEL 456, TEXAS INSTRUMENTS CALCULATOR MODEL 789, PROTRACTOR, SKETCH PAD, EARTH SCIENCE TEXTBOOK

CURRENT SEN EQUIPMENT REMINDERS AND ALERTS:  160

162                              164
| CLASS | DUE DATE | BRING | DON'T BRING | EQUIPMENT ALERT — 170 | RATING |
|---|---|---|---|---|---|
| MATH I | 2/2/05 | • TEXAS INSTRUMENTS CALCULATOR | • PROTRACTOR | 1. DOWNLOAD UPDATED FINANCIAL FUNCTIONS | |
| EARTH SCIENCE | 3/1/05 | • DELL NOTEBOOK MODEL 123<br>• EXPLORATIONS IN EARTH SCIENCE TEXTBOOK CHAPTER 3<br>• NOKIA CELL PHONE MODEL 456<br>• SKETCHPAD | | 1. MOVE BOOKMARK FROM CH. 2 TO CH. 3<br>2. DIGITAL CAMERA IN NOKIA CELL PHONE CAN CONVERT BMP FORMAT PHOTOS TO TIFF FORMAT<br>3. DELL TABLET MODEL 987 AVAILABLE TO REPLACE SKETCHPAD — 165 | |

161

SEN EQUIPMENT UPGRADE ORDER STATUS:  171          175                                    173
| RECOMMENDED SUPPLIER | AVAILABLE UPGRADE | COST | APPROVE ORDER | REJECT ORDER | DELIVERY DATE | RATING |
|---|---|---|---|---|---|---|
| TEXAS INSTRUMENTS | UPDATED CALCULATOR FINANCIAL FUNCTIONS | $2.00 | X - 1/29/05 | | | |
| DELL | DELL TABLET COMPUTER MODEL 987 | $1400.00 | | X - 1/29/05 | 2/1/05 | |

105 — Service Provider: _IBM Global Services_ Current Date 1/29/05 Contract Begins: 1/1/05 Ends 12/31/05

109 — Service Level Agreement Performance Metrics:

Goal:
1. 90% accuracy of equipment alerts
2. 90% timeliness of equipment alerts consistent with privacy notification preferences
3. 90% on time delivery of ordered equipment upgrades Actual to Date:
1. 60% accuracy of equipment alerts
2. 95% timeliness of equipment alerts consistent with privacy notification preferences
3. 70% on time delivery of ordered equipment upgrades 103 — In Scope Population:

Student Years: Freshman    Majors: Liberal Arts

107 — In Scope Services:

Equipment alerts: X bring X don't bring X recommended upgrades ⎫ 106
                                                                ⎬ task performance tips
Available notification channels: X instant messaging X phone call _ pager
Privacy notification channel option: X available _ not available
Alert refresh frequency _ monthly X weekly _ daily _ hourly _ real time — 108

Price Charged by Service Provider: $500 per student plus equipment upgrade costs

FIG. 12

Sponsor: Ohio State University Business Office  Current Date: 1/29/05  Contract Begins: 1/1/05  Ends: 12/31/05

Service Level Agreement Performance Metrics:

Goal:
1. 90% accuracy of equipment alerts
2. 90% timeliness of equipment alerts consistent with privacy notification preferences
3. 90% on time delivery of ordered equipment upgrades

184

Actual to Date:
1. 60% accuracy of equipment alerts
2. 95% timeliness of equipment alerts consistent with privacy notification preferences
3. 70% on time delivery of ordered equipment upgrades

183

Costs for Services:

| IN SCOPE SERVICES VISIBLE TO SPONSOR | TARGET ANNUAL COST/STUDENT | PROJECTED ANNUAL COST/STUDENT BASED ON CURRENT PERFORMANCE |
|---|---|---|
| EQUIPMENT ALERTS: X BRING X DON'T BRING X RECOMMENDED UPGRADES TASK PERFORMANCE TIPS | $300 | $280 |
| AVAILABLE NOTIFICATION CHANNELS: X INSTANT MESSAGING X PHONE CALL PAGER | $30 | $25 |
| PRIMARY NOTIFICATION CHANNEL OPTION: X AVAILABLE - NOT AVAILABLE | $30 | $30 |
| OPTIONAL SERVICES, NOT VISIBLE TO SPONSOR, TO IMPROVE METRICS | | |
| - SEMANTIC-BASED CAPABILITY MATCHING FOR RECOMMENDED UPGRADES | $25 | |
| - TASK EFFICIENCY PERFORMANCE MEASUREMENT FOR RECOMMENDED UPGRADES | $25 | |

187  185

Supplier Performance:

| SUPPLIER | SERVICES PROVIDED | PRICE COMPETITIVENESS | DELIVERY TIMELINESS |
|---|---|---|---|
| TEXAS INSTRUMENTS | CALCULATORS AND RELATED SOFTWARE UPDATES | GOOD | GOOD |
| STAPLES | CELL PHONES, DIGITAL CAMERAS, OFFICE SUPPLIES | EXCELLENT | POOR |
| DELL | NOTEBOOK COMPUTERS | EXCELLENT | EXCELLENT |
| AMAZON | TEXTBOOKS | FAIR | EXCELLENT |
| E-BAY | PRINTERS | EXCELLENT | GOOD |

180

SYSTEM AND METHOD FOR NETWORKING EDUCATIONAL EQUIPMENT

CROSS REFERENCE TO RELATED APPLICATIONS

The present application is a continuation application of U.S. Ser. No. 11/184,512, filed Jul. 19, 2005, the entire contents of which are incorporated herein by reference.

BACKGROUND OF THE INVENTION

1. Field of the Invention

The present invention relates generally to the field of education and systems and methods providing reminders for students about their attendance and accompanying equipment needs. More particularly, the present invention is directed to a service oriented architecture comprising a networked system including a given students active electronic devices that are adapted to invoke web services; and passive devices, which lack computing capability but have sensors, to provide monitoring, notification and hardware and software upgrade ordering services for these devices by using these devices in conjunction with web based infrastructure components.

2. Discussion of the Prior Art

Students, of a particular education system, according to requirements of a classroom or subject, and/or as necessary to facilitate and enhance a student's education, are required to own or possess many types of devices. Typical devices may include, but are not limited to: writing utensils, backpacks, homework, pocketbooks, protractors, textbook, compasses, paper notebooks, pencil sharpeners, lab notebooks, markers, and other devices that are not normally viewed as being electronic in nature, and laptop computers, personal digital assistant, cell phones, pagers, E-notebooks, e-books, e-pencils, calculators, etc. that are electronic in nature. As education technology advances, the amount and types of devices is only expected to increase.

Often, students would like to know "if they have everything" they need to ensure readiness for a particular class, and/or to facilitate student organization and productivity.

Currently, there exist techniques for using a networked system of communications devices to route messages between the devices using wireless technologies such as BlueTooth, for example. Different devices may be further adapted to communicate with devices to communicate with external sources on behalf of the network in order to maintain communications or conserve battery life. Besides these synchronization and transfer techniques for personal area networks, other techniques relate to the use of device identifiers for the purpose of locating a lost device which is part of a network.

In the education domain, wireless infrastructures with networked devices are provided in classroom settings to enable collaboration between the teacher and students or between peer groups of students working in teams. Previously disclosed techniques refer to monitoring and evaluating user device data for the purpose of assessing the efficiency of user task performance in order to provide recommendations on more effective techniques to complete a task. As an example of current practice, Microsoft application software products such as Microsoft Word® currently provide a form of this context aware coaching to end users.

Additionally, there currently exist techniques for using web services to enable automated ordering from online catalogs or notifications to end users of available products or services which meet predefined criteria.

There currently exist techniques in semantic-based capability matching that have been used to discover and compose Web services. A requester of Web services submits the specification of Web services s/he needs to perform his/her tasks, while there is a set of Web services available from service providers with their specification. Often the specification of service requirements and that of available services employ different vocabularies to describe services. To consistently understand the meaning of the specifications and effectively match services requested and provided, the semantic-based capability matching technique utilizes an ontology or semantic model which specifies the relationships among different words or terms such as synonyms, hypernyms, hyponyms, subsumption, etc. The relationship information enables matching service specifications based on their meaning by identifying, for example, different words with the same meaning or the same words with different meaning, etc. Another prior art of semantic technology is semantically-enhanced search. There has been active research to improve the search results by tagging document and resources over networks and/or desktops with metadata or concepts from semantic models (or ontology) that again specifies the relationships among different words or terms in related domains.

While such systems address various aspects of providing tools to enable the student to locate lost equipment, order upgrades and improve task performance, it would be highly desirable to provide a comprehensive end-to-end system which combines these previously disclosed techniques into a system for providing students with accurate and timely reminders of which devices to bring or leave home, and to receive alerts when hardware or software upgrade orders are required to enable the student to meet class task assignment performance criteria.

SUMMARY OF THE INVENTION

It is an object of the present invention to provide a comprehensive end-to-end system, method and computer program product that combines these previously disclosed techniques for providing students with accurate and timely reminders of which devices to bring or leave home, and to receive alerts when hardware or software upgrade orders are required to enable the student to meet class task assignment performance criteria.

Such a system, method and computer program product enables students to receive these reminders and alerts, to order the necessary upgrades from suppliers via web services, and to monitor delivery from a single user interface provided on one of their devices via a web browser. Students are thus able to specify their preferred notification channels including privacy preferences for situations in which they were in public.

In addition to services provided by a service provider to an individual student, the system, method and computer program product of the invention is further adapted to enable a sponsor such as a university to engage a service provider on behalf of a group of students, or a corporation to engage a service provider on behalf of their employees, based on performance metrics included in a service level agreement.

The system, method and computer program product of the invention is configured as a service oriented architecture so that components could be added on demand and be provided or used by various stakeholders. For example, such a system integrates previously disclosed techniques in user task performance efficiency assessment and semantic-based matching to optionally improve the accuracy of recommendations to students regarding needed hardware or software upgrades.

Thus, according to one aspect of the invention, there is provided a system for monitoring availability of end user devices needed for performing tasks, the system comprising:

a first network comprising one or more devices associated with an end user, at least one end user device comprising means adapted for communicating with a service provider via a second network, the service provider providing network-based services in the system;

a means for maintaining information of tasks associated with an end user, the information including recommended end-user devices adapted to perform the tasks, the tasks information provided to at least one end-user device by the service provider; and, at least one end-user device comprising means for detecting non-availability or performance deficiencies of any end-user device required in performing end-user tasks, wherein the means adapted for communicating with a service provider generates signals for invoking network-based services via the second network to facilitate correcting non-availability of any end-user device.

The detecting means implemented in the system and used for implementing the method of the invention comprises a means for comparing a current inventory of devices associated with a particular end-user with said recommended end-user devices adapted for performing said tasks for said end-user.

The information maintained in the system and used for implementing the method of the invention includes recommended performance criteria associated with each device sufficient for performing end-user tasks, the means for comparing further comparing a performance configuration of an end-user device associated with a task with the associated recommended performance criteria, the at least one end user device invoking network-based services from a service provider via the second network for correcting performance deficiencies of an associated end-user device.

The comparing means implemented in the system and used for implementing the method of the invention further comprises a semantic based capability matching means adapted for matching said recommended performance criteria and the end-user device performance configuration.

According to a further aspect of the invention there is provided a method for monitoring availability of end user devices needed for performing a task comprising:

providing at least one device of a first network of one or more end user devices associated with an end user with capability for communicating with a service provider via a second network, said service provider providing network-based services;

maintaining information of tasks associated with an end user and recommended end user devices adapted to perform said tasks;

receiving signals by said at least one end user device that indicate said tasks and recommended end user devices information for a particular end user;

detecting non-availability or performance deficiencies of any end user device used in performing end user tasks; and, generating signals for receipt by a service provider for invoking network-based services via said second network to facilitate correcting non-availability of any end-user device.

Advantageously, the networked system and method of the invention, while adapted for use by student end-users in the context of an educational system, may be adapted for use in a corporate and other industry-specific settings with end-users comprising employees working for a company, for example, who use equipment in the performance of their tasks, or who need to learn a new skill, for example.

BRIEF DESCRIPTION OF THE DRAWINGS

The objects, features and advantages of the present invention will become apparent to one skilled in the art, in view of the following detailed description taken in combination with the attached drawings, in which:

FIG. 2 depicts a generic flow chart 200 showing the general steps in using the inventive system, regardless of specific scenarios;

FIG. 3 is a flow chart showing an example equipment monitoring scenario process 225 implemented by the system of the present invention;

FIG. 4 is a flow chart showing an example supply replenish scenario process 300 implemented by the system of the present invention;

FIGS. 5A and 5B depict a flow chart showing an example field trip scenario process 350 implemented by the system of the present invention;

FIG. 6 depicts example records 400 generated for and stored in a class and assignment database for use with the inventive system;

FIG. 7 depicts example records 450 generated for and stored in a student equipment and notification channel database for use with the inventive system;

FIG. 8 depicts example records 475 generated for and stored in a student task efficiency performance database for use with the inventive system;

FIG. 10 is a diagram illustrating an example end user interface 150 where equipment reminders, alerts and upgrade order management are provided by the inventive system;

FIG. 11 is a diagram illustrating an example interface 100 where sponsors 20 specify in-scope services and monitor performance metrics against service level agreements with the service provider; and, FIG. 12 is a diagram illustrating an example user interface 180 where service providers 25 monitor costs and supplier performance and modify optional service parameters to adjust performance metrics in service level agreements with the sponsor.

DETAILED DESCRIPTION OF PREFERRED EMBODIMENT

Figure 1:
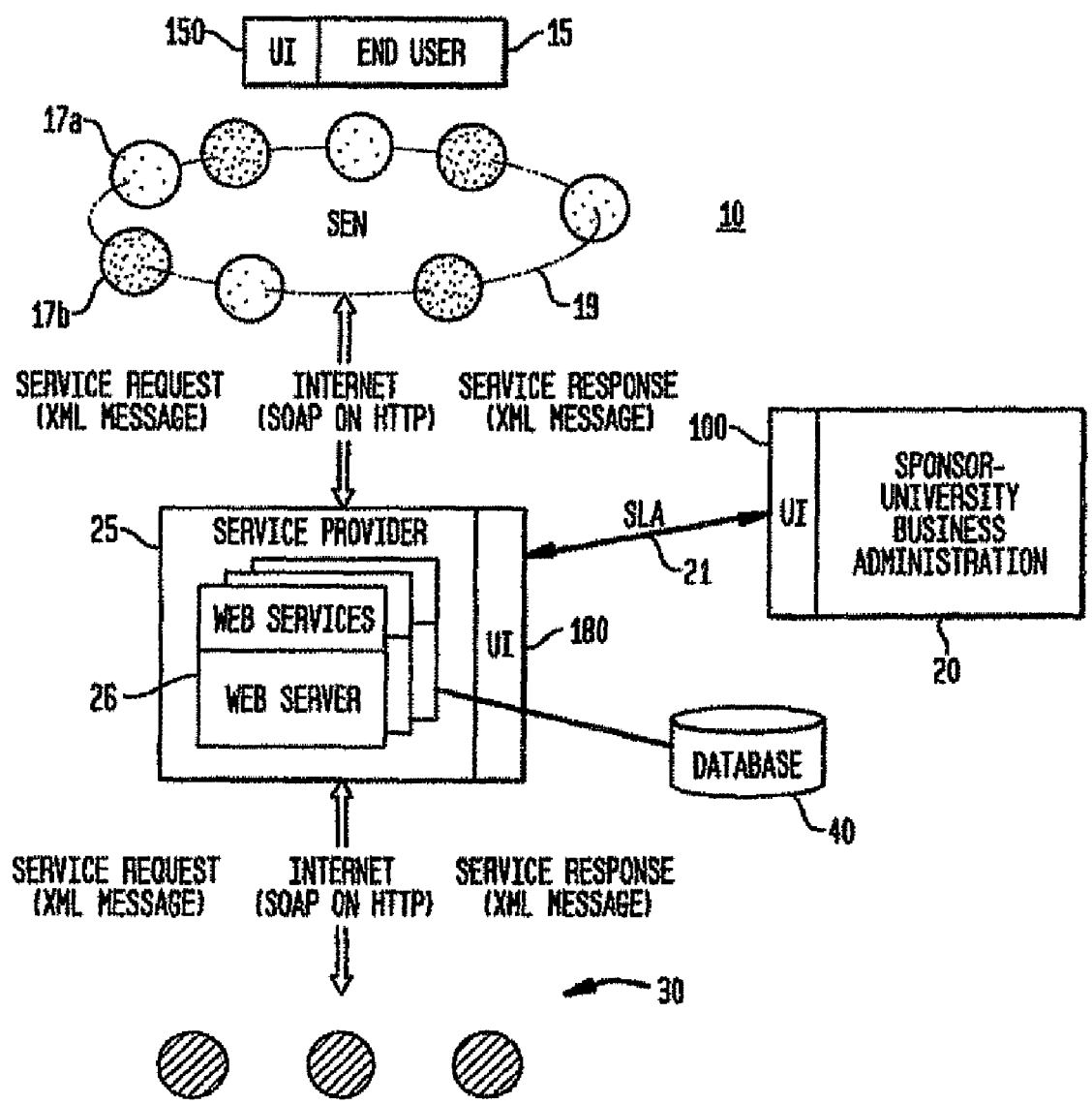
FIG. 1 is a schematic showing an example architecture 10 and conceptual flow of an example system, including major technology infrastructures and user interfaces for stakeholders.

FIG. 1 is a schematic depicting an example architecture and conceptual flow of an example system of the invention, including major technology infrastructures and user interfaces for stakeholders. The invention applies service oriented architecture and technologies to provide equipment reminder and upgrade services to student end users based on negotiated service level agreements between sponsors and service providers.

As shown in FIG. 1, the system 10 includes four different types of users of the inventive system: (1) end users 15 (e.g., university students, corporate employees, etc.); (2) sponsors 20, e.g. a university or corporation; (3) service providers 25 such as IBM, Amazon.com, ebay.com, etc. implementing a Web server 26 providing web services, e.g., IBM WebSphere Application Server with IBM DB2, or like computing module serving all applications (in form of Web services) for computing devices in the network; and (4) suppliers 30, e.g., equipment shops, class material suppliers, financial institutions (e.g., banks), logistics providers, etc.

As shown in FIG. 1, associated with the end user 15 are active devices 17a characterized as devices with computing capability and adapted for invoking Web services including, but not limited to: thin clients without large scale databases such as laptop and mobile computer devices, PDAs, cell phones, E-notebooks, e-book, e-pencil, calculators, etc., and passive devices 17b characterized as supplies/devices without computing capability however, having an associated unique identifier, and which may or may not have sensors, such as RFID tags, and will not invoke Web services from an external network. Such devices include, but are not limited to: a pencil, pencil sharpener, markers, backpacks, pocketbooks, protractors, compasses, etc. Furthermore, one or more of the end-user devices may include tracking or location ability, e.g., may include a GPS capability or like tracking technology. It should be understood that the active and passive end user devices may be worn on the body, attached to the body, carried by the user, or nearby to the user, e.g., in the user's closet.

The Student Equipment Network (SEN) 19 including an array of an end-user's active and passive devices 17a,b is configured as a wireless network, e.g., intranet or piconet, implementing wireless network protocols and communicating by wireless means, e.g., Bluetooth transmitters/receivers, IEEE 802.11 and like wireless communication protocols, infrared, sensor network, RFID network, etc.; however, wired network communication protocols may be employed. It is understood that contemplated active devices include those adapted for communicating over an electronic, magnetic, optical, electromagnetic, infrared, or any other signal propagation medium. One of the end user active devices 17a may perform the function of a central computing device coordinating and managing the activity of a group of devices comprising the SEN 19 and its operation. Additionally, the individual devices or the networks for a plurality of devices may be connected together by means of an external network, e.g. the Internet. As an example, a student may have his "equipment" or personal items equipped with Bluetooth wireless transmitter/receiver devices. All of the devices may be connected, in addition with a central computing device, to form the SEN. It is understood however, that the network of devices may be associated with a member of a group, e.g. family, classroom, school, town, school district, state, government, company, geopolitical entity. Additionally, the SEN intranets of more than one individual may be connected through their individual central computing devices to a large network (e.g., the Internet); and, the individual networks may be monitored or controlled. Alternatively, in the absence of a central computing device, individual devices may be connected directly to an external network such as the Internet or Public Switched Telephone Network (PSTN) for monitoring. Thus, such devices include the proper network adapters (e.g., network interface cards, modems, cable modems, Ethernet cards, etc.) for communications with private or public networks. It should be understood that the active devices of the SEN network further have the capability of communicating (e.g., receiving and notifying) with various parties, e.g., a user, parent, teacher, other student, principal, third party, etc., by means of e-mail, sound, text, visual indicator, phone call, fax. Such communications may facilitate reception of information such as device advertisements, "how-to" instructions, warranty information, etc.

As shown in FIG. 1, the system 10 provides a user interface ("UI") for each type of end user except the suppliers 30. In operation, via an active device adapted for invoking Web services, service requests may be communicated over the Internet (Web) from the SEN 19 to the service provider 25, for example, in the form of an XML message and, service responses may be received from the service provider 25, for example, in the form of an XML message. Likewise, service requests may be communicated over the Internet (Web) from a service provider 25 to suppliers 30, for example, in the form of an XML message and, service responses may be received from suppliers 30, for example, in the form of an XML message. Any like message communication protocol may be implemented for invoking Web services according to the invention. As will be described in further detail herein, computing services may include, but are not limited to: service requests and responses to request for class schedules for specific students, required equipment and related settings, and task assignment details for specific classes for specific students including descriptions of required report formats, analysis techniques and deliverables. Further service requests and responses include: requests for catalog (catalog service), purchase orders (purchase service), payment and logistic service requests to replenish or upgrade equipment in the SEN, and service requests and responses requesting data comprising, for example, equipment specifications matching equipment model number in said specific student SEN. These computing services may be W3C-specified web services based in XML standards including but not limited to XML, WSDL, SOAP on HTTP and UDDI.

More particularly, end users 15 are enabled, via their user interface 150, to view current equipment status, reminders and notifications about recommended upgrades, take action on recommended upgrades, and rate the provided notifications and upgrade recommendations. Sponsors 20 of the system, in conjunction with service providers 25, specify and modify the target student population and in scope student equipment network services and monitor performance against metrics in the service level agreements 21 (SLA) with the service provider. Service providers 25 monitor performance against metrics in the service level agreements with the sponsor, monitor supplier price and delivery performance, and invoke optional services as needed to attempt to improve metrics in the service level agreement. Accessible to service providers are one or more memory storage devices forming a database 40 comprising a store of all the data used by the computing devices in the network as will be described in greater detail herein. Such memory storage devices may comprise volatile or non-volatile memory computer-readable medium including but not limited to: semiconductor or solid state memory, magnetic tape, removable computer diskette, a random access memory (RAM), a read-only memory (ROM), magnetic disk, optical disk, and like non-transitory media. As shown in FIG. 6, the database includes records 400 comprising a students' class and assignments data, e.g., records populated with the list of classes, enrolled students, assignments, due dates, task assignment performance criteria, and recommended equipment lists provided by instructors for the classes being provided to the in scope student population between the beginning and ending dates specified by the sponsor 20. As will be further described in greater detail herein, database 40 further includes, as shown in FIG. 7, records 450 comprising students equipment and notification channels such that the service providers access. As shown in FIG. 8, the database further comprises records 475 accessible to the service provider that are populated with information including the in scope student 480 and tasks 483 that have been assigned to that student and information associated with performance of those tasks.

Returning back to FIG. 1, suppliers 30 receive and respond to requests for specific equipment upgrades and other services. Thus, additional computing services provided by the service providers includes web services for adding/updating/retrieving data from the database, which can be used by the service provider, suppliers, student, and the university. It is understood that any or every web service provided by the service provider(s) 25 accesses data and information stored in the database 40.

The operation of the system 10 is initiated when the sponsor 20 and service provider 25 agree on the in scope student population and in scope student equipment network services and performance metrics associated with the delivery of student equipment network services to target end users, and enter or modify the specifics of the service level agreement (SLA) on the sponsor's user interface, an example 100 of which is depicted in FIG. 11. In addition to services provided by a service provider 25 to an individual student and paid for by that student's parent, for example, the system enables a sponsor such as a university to engage a service provider on behalf of a group of students, or a corporation to engage a service provider on behalf of their employees, based on criteria included in a service level agreement.

As shown in FIG. 11, via the sponsor's user interface 100 according to an example application, the sponsor, in agreement with the service provider 25 may identify the in scope student population 103 in various ways, for example by year in school and major, and to delimit the beginning and ending dates of service 105. Additionally, the sponsor's user interface 100 enables the sponsor to select from available student equipment network (in scope) services 107, examples of which include, but are not limited to: notifications to students regarding missing or unnecessary equipment for upcoming classes, and recommended equipment upgrades. Among exemplary in scope services that may be governed in the SLA, Sponsors 20 can elect to provide students with tips on improving task performance, and/or can additionally elect to enable students to indicate notification channel preferences and extra privacy preferences when receiving notifications in public situations such as when they are in class. Sponsors and service providers, via the sponsor's user interface 100 shown in FIG. 11, can further agree on an initial alert refresh frequency to account, for example, for situations in which changes in assigned educational tasks result in modifications to the equipment students need to bring to class or upgrades they need to order. The sponsor's user interface 100 shown in FIG. 11 also enables the sponsor, in agreement with the service provider, to specify the initially agreed upon performance metrics 109 associated with their service level agreement. Examples of possible performance metrics for the inventive system include, but are not limited to: 1) Accuracy of equipment alerts such as missing equipment, unnecessary equipment, warnings about defective equipment, recommended upgrades to existing equipment, etc. The accuracy is rated by the student; 2) Timeliness of the received alerts consistent with the privacy notification specifications by the student; and, 3) Timeliness of the delivery of equipment upgrades the student has ordered based on the recommendations provided by the system 10.

After an agreement between the sponsor and service provider on the in scope student population, in scope services, inclusive dates of service, and associated metrics, and before the first use by end users, the system 10 performs several pre-processing steps including:

1. The service provider 25, via their user interface 180 shown in FIG. 12, selects initial suppliers for the various services to be provided by the system.

2. The Class and Assignment database associated with the service provider is populated with database records, exemplary records 400 of which are illustrated in FIG. 6. As shown in FIG. 6, a class and assignment database record 400 are populated with information including, but not limited to: a list of classes 403, enrolled (in scope) students 405, assignments 407, due dates 409, task assignment performance criteria 411, and recommended equipment lists 413 provided by instructors for the classes being provided to the in scope student population between the beginning and ending dates specified by the sponsor 20 via their user interface 100 as shown and described herein with respect to FIG. 11.

3. The Student Equipment and Notification Channel database associated with the service provider 25 is populated with the database records, exemplary records 450 of which are illustrated in FIG. 7. As shown in FIG. 7, records 450 are populated with information including the in scope student 453 and classes 457 that student is enrolled, the current equipment list 459 for that student, and, that student's default notification channel 461 and privacy notification channel 463.

4. A Student Task Efficiency Performance database associated with the service provider is populated with the database records, exemplary records 475 of which are illustrated in FIG. 8. As shown in FIG. 8, records 475 are populated with information including the in scope student 480 and tasks 483 that have been assigned to that student between the beginning and ending service dates specified by the sponsor. This database will be updated if the sponsor 20 selects the optional task performance tips service via their user interface 100 shown in FIG. 11. Such updates include information such as: the date finished 485, elapsed 487, time vs. student mean 489, supplies used 490, and the supplies used vs. the student mean 493, 5. The system 10 compares, for each in scope student, the list of current student equipment for that student such as shown in the database record field 459 of FIG. 7, with the recommended equipment lists as shown in the database record field 413 of FIG. 6.

Additionally, as shown in FIG. 6, the Recommended Equipment column 413 field indicates a correct setting for the particular assigned task. Subsequently, in response to the comparison or at various time intervals, the system populates the End User Interface 150 shown in FIG. 10 with reminders 160 about required and unnecessary equipment for the upcoming classes, consistent with the in scope services selected by the Sponsor 20 via their user interface (FIG. 11). Additionally, the system, through the End User Interface 150 shown in FIG. 10, provides reminders about correct equipment settings 165 to change and recommends needed upgrades 170. An example upgrade reminder may include, for example, a suggested upgrading of calculator financial functions in order to complete the calculation of interest on home mortgages in the assignment field 407 such as shown for end-users in the Math 1 example database record of FIG. 6. In one embodiment of the invention, a particular passive device in the SEN, while not capable of initiating web services, has, in addition to sensors, actuators, e.g., to turn an e-book to a correct page, or to close the clip on a backpack. Thus, an adjustment signal may be generated prior to the class assignment due date and after the last completing use of the item which would require that it have a different setting, e.g., a different assignment requires a different page setting. The adjustment signal may be generated by an active device in the SEN using a wireless communications means such as BlueTooth. It should be understood that, with respect to monitoring, in the context of performance of assigned tasks, there is supposed a workflow or a process model of student activities which defines a sequence of activities to be performed to complete a task. Each activity in a process model and also the process model itself is associated with one or more measures indicating the status. Each measure is associated with (a range of) values indicating the norm status. The monitoring provided with an active device, including sensing, recognition and detection of events, detects if one or more of such measures are out of the range of norm status (e.g., backpack is not closed), i.e., additionally referred to herein as anomaly status. Once an event is monitored and detected, then the system adjusts or responds to it to put the it back to a normal status. It is understood that there is a continuum of monitoring from noting just missing equipment (supply replenish) to monitoring the correct setting of equipment, to recommending upgrades in cases where the current equipment specifications in FIG. 7 do not match those in the Class and Assignment Database FIG. 6.

In operation, the first use of the system by end users includes a user, e.g., a student, accessing his/her End User Interface 150 shown in FIG. 10, which can be displayed on any active device 17a available to the student.

When each end user initially opens their End User Interface 150 they will be reminded to modify the default normal notification channel 187 and privacy notification channel 188 selected by the system and noted in the interfaces depicted in FIGS. 7 and 10 during pre-processing setup. Upon updating the default notification channels, end users, via the End User Interface 150 shown in FIG. 10, will see the reminders regarding needed equipment to bring 162, reminders regarding unnecessary equipment not to bring 164, and equipment settings to change 165, all for specific upcoming classes. The system additionally generates for the end users view a list of recommended equipment hardware and software upgrades 175 and their cost. End users 15 will use the interface 150 to approve or reject specific recommendations for upgrades which will then be transmitted by web services associated with the system.

FIG. 2 depicts a generic flow chart 200 showing the general steps in using the inventive system, regardless of specific scenarios. As shown in FIG. 2, in a first step 202, an active device in the SEN detects a situation requiring the attention of the user. Then, at step 204, one or more web services are initiated by the active device to a supplier's server which retrieves requested information from the database or computes the information as indicated at step 206. In one embodiment of the inventive system, the service provider receives the web service request from the active device in the SEN, initiates a web service to the supplier provider, and then provides the returned information to the active device. In this process, the supplier's server may return the requested information relative to the situation requiring attention to the active device as depicted at step 208.

After the student makes a decision in response to the detected situation, as depicted at step 210, another web service is initiated to provide the recommended service to correct the situation requiring attention. This may involve steps such as enabling the user (e.g., student) to invoke a service to a service provider's server via a user interface as depicted at step 212, and that service provider's server, in response, may invoke one or more services to supplier's server as depicted at step 214. Then, the supplier's server replies to the service provider with service responses as depicted at step 216, and, the service provider's server in response, replies to the user with the service responses as depicted at step 218. The final step 220 shown in FIG. 2 represents the confirmation by the active device that the transaction initiated to respond the detected situation has been completed. The process proceeds to next step 223 where a determination is made as to whether any further "situations" exist that need processing. If another situation has been detected, then the process returns to step 202 where the active device in the SEN detects a situation requiring the attention of the user; otherwise, the process terminates.

One type of "situation" referred to in FIG. 2 that is addressed by implementation of the present invention is the detection and the correction of a variety of anomaly conditions involving equipment settings. For example, some of the passive devices shown on FIG. 1, such as pencils, pencil sharpeners, and protractors, may have sensors but may require manual adjustment. Other passive devices (such as a backpack) as well as active devices (e-book) may be machine adjustable. In an example monitoring scenario of the inventive system, depicted in FIG. 3, anomaly conditions detected may include, for example, an unsharpened pencil, an open protractor, an open backpack being carried by the student, or an e-book on the incorrect page for a current class assignment.

FIG. 3 is a flow chart showing an example equipment monitoring scenario process 225 implemented by the system of the present invention. As shown in FIG. 3, the monitoring scenario, comprises a first step 226 representing the step of enabling an active device to measure the current value of an active or passive device in the SEN. Then, in the next step 228, the active device invokes an anomaly detection service (current value) to a supplier provider's server 26. Example anomaly detection services include a web service initiated by an active device which queries the database for Class and Assignment records shown in FIG. 6 to determine, for example, that the e-book needs to be adjusted to Chapter 3 in preparation for the field trip. Another anomaly detection service would determine that two sharpened pencils are required for a specific class assignment and that one of the two pencils carried by the student is in need of sharpening. As depicted at the next step 231, the anomaly detection service matches the current value with a norm value that may be comprised of historical measures showing norm and anomaly cases; the anomaly detection may use data mining/machine learning algorithms for detecting anomalies against the historical data. The process proceeds to next step 234 where a determination is made as to whether an anomaly has been detected. If an anomaly has not been detected, then the process proceeds to step 249 which represents the step of determining whether there are any further anomalies regarding other devices in that user's SEN whose value is to be evaluated. Thus, the process returns back to step 226 if there is a further device to process; otherwise, the process terminates. Returning to step 234, if the anomaly detection service determines that an anomaly exists, then the process proceeds to step 237 which represents the step of initiating a notification, by the service provider's server, to the SEN 19 (via the active device) about the detected anomaly. The next step 240 represents the step of enabling the active device to notify the user (e.g., student) about the detected anomaly. The next step 243 comprises the step of determining whether the anomaly may be corrected, for example automatically via the network. Thus, a determination is made whether the anomaly is machine adjustable. For example, in cases where the device is machine adjustable, such as the e-book, the e-book may be moved to the correct page for the upcoming assignment without manual intervention. In one example embodiment, the active device may generate an adjustment signal, for example, that an e-book may respond to for turning an e-book page to a correct page. An adjustment signal may additionally be generated to control an actuator for automatically closing a student's backpack without manual intervention. In such an example, the backpack, calculator, e-book and other educational items are equipped with sensors that relay the e-book or other settings through the SEN intranet or to an external monitor to confirm that the devices are set properly (e.g. e-Book turned to the right page; the backpack is closed to prevent items from falling out, etc.). Otherwise, in cases where the device is not machine adjustable, such as the pencil, the student is reminded via their end user interface, to sharpen the pencil. Thus, if the detected anomaly is not machine adjustable, the process proceeds to step 245 where the user is prompted to adjust the device to the norm status; otherwise the process proceeds to step 247 where the SEN's active device is invoked to adjust the device to the norm status. The process then proceeds to step 249 which represents the step of repeating the process, if necessary, to determine whether there are any further anomalies regarding other devices in that user's SEN whose value is to be evaluated.

The method for monitoring depicted in FIG. 3, may optionally be embodied to provide reminders to the student regarding when they should begin assignments so as to complete them in a timely way, based on a historical record of the same students elapsed time and supplies used in similar previous assignments as shown in Student Task Efficiency Performance database records of FIG. 8. The same historical data may be used by the system to identify the need for task efficiency performance tips if this optional service is selected as indicated in field 186 of the Service Provider User Interface shown in FIG. 12. As an example, if a specific student has historically taken longer than the mean task completion time for a certain type of assignment the system, in the Equipment Alert field 170 in the End User Interface 150 shown in FIG. 10, will remind the student when to start on the assignment to insure completion by the date shown in the Date Due field 161 for that class. The trigger for the reminder/warning would be the elapsed time for the last similar assignment. Thus, with respect to a student activity workflow, the monitoring/anomaly detection leverages the historical data about one or more student activities and the associated measures that represents both the norm and anomaly status of the system. One or more data mining algorithms may be used that can classify measures into two or more classes including the norm and anomaly status, to detect events.

Another type of "situation" referred to in FIG. 2 that is addressed by implementation of the present invention is the replenishing of an end user's inventory supply. As shown in FIG. 4, the Supply Replenish Scenario functionality 300, is initiated as follows. At a first step 302, the SEN makes an RFID based determination of an end user's inventory level of passive supplies, e.g., notepads or other supplies without computing capability that may have sensors such as RFID tags. In one implementation, the end user's inventory level of passive supplies is determined by an active device interacting with the databases 40 and web services according to the invention. However, to address privacy concerns, identifying and notifying of student equipment is performed within the SEN and not via web services. At step 302, the active device of the SEN particularly checks, by using RFID, if the end user student carries all the equipment required for a class or a task as specified in the class specification—this specified class or a task in the class specification having been previously downloaded by using a computing service over the Internet. Then, at step 304, the active device makes a determination if the amount of a particular item is below a predetermined level. The active device will then notify the student of anything is missing via that student's UI. It is noted that this identification and notification of equipments currently carried by the student is performed all within the SEN (once the class specification has been downloaded). Thus, for example, an active device in the network, for example, a laptop or a PDA carried by the student, compares the quantity of notepads such as the quantity included in the listed equipment in FIG. 7 (the Student Equipment and Notification Channel database record 450) for the subject student, with the total number of notepads required according to the upcoming classes listed in FIG. 6 (the Class and Assignment database record 400). If a discrepancy is noted at step 304, the system invokes a catalog service and initiates generation and sending of a catalog service request via web services 26 such as shown at step 307. The catalog service retrieves a catalog from the database and returns a catalog service response via web services to the end user via that student's preferred notification channel as indicated at step 310. This response, including the recommended supplier, cost and available upgrade, is listed in the Order Status portion 171 of the End User Interface 150 shown in FIG. 10 and, a notification is also sent to the student via the preferred notification channel selected on FIG. 10. In this example, the student end-user will receive an instant message recommending the order of additional notepads, unless the subject invention determines that the student is in public, in which case the privacy notification channel, i.e., e-mail in this example, will be used to notify the student of the recommended upgrade order.

The aforementioned identification of current number of notepads carried by the subject student and comparison with class requirements can, in one embodiment of the invention, be performed locally within the SEN, after downloading of the relevant data from the Class and Assignment database described in FIG. 6, via web services. One of the advantages of embodying the invention in this manner is the protection of personal information, by not exposing personal information to the Internet in real-time of what is carried as part of the student's equipment and what is missing compared with required equipment. This feature provides the ability of the subject invention to respect privacy notification channels. Moreover, the invention can be embodied to require a student to first give agreement before any personal information about the student's current equipment profile, order history, etc. can be stored on the Internet, external to the student's own active devices, so as to accessible via web services. Another advantage is the reduced response time performance of the inventive system by not transmitting enormous amount of real-time data over the network.

Referring back to FIG. 4, at step 313, the Supply Replenish Scenario further comprises the steps of: enabling the student to make a purchase decision of the recommended item and initiates the generation of a Purchase Order (PO). The purchase order service request is generated and includes information such as: item, quantity, payment information, delivery information, etc. Then, as indicated at step 317, the PO service invokes a payment service for credit check and invokes a logistics service for shipping/handling. Furthermore, the PO service request, payment service request and logistics service request are forwarded to the suppliers 30 including the equipment shops, banks, logistics providers etc., for processing. Next, as indicated at step 320, the supplier's servers process the service requests, and provides the payment service and logistics service responses back to the service provider. Then, at step 323, the service provider's server informs the end-user accordingly of the PO service response and at step 325, the active device confirms the completion of the user's transaction. Although not shown, an additional step may be performed to supply the service information to the Sponsor in order to determine the efficiency and compliance with the SLA service performance metrics. The process then proceeds to step 328 which represents the step of repeating the process, if necessary, to determine whether the inventory levels of any other supplies in that user's SEN are deficient.

Figure 5B:
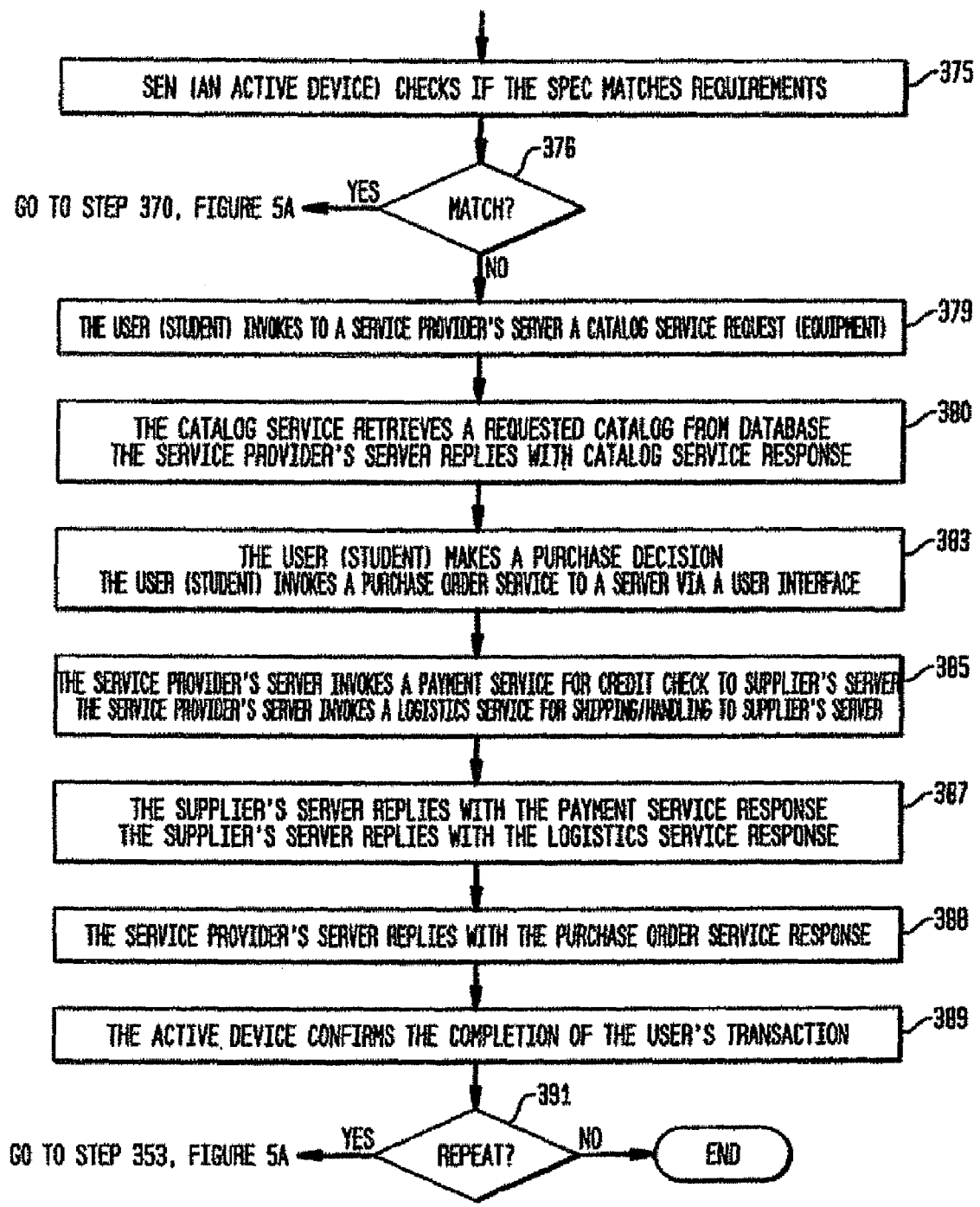

Another type of "situation" referred to in FIG. 2 that is addressed by implementation of the present invention is the preparation of end-users scheduled for a class field trip. FIGS. 5A and 5B depict a flow chart showing an example field trip scenario process 350 implemented by the system of the present invention. As shown in FIG. 5A, in the Field Trip Scenario 350, as indicated at a first step 353, the end user, via an active device, generates and sends a request for materials required for an upcoming class trip. The request is received by the service provider's web server 26 and the request is processed by retrieving the requested information data from the appropriate database (e.g., Class and Assignment database 400 of FIG. 6) as indicated at step 355. As further indicated at step 355, the class materials service response is returned to the end user. Then, at step 358, by using RFID scanning functionality, the network determines if the student carries all the equipment required for the field trip as specified in the Class material (field trip). A determination is then made at step 360 whether all of the equipment is being carried. If at step 360 it is determined that the end-user has all of the class materials required, the process ends. Otherwise, at step 360, if it is determined that the end-user does not have certain class materials, the system's active device automatically notifies the student what equipment is missing as indicated at step 363. Continuing, a further determination is made at step 365 to check whether the specifications available for the equipment the end user is carrying meets the requirements (e.g., task performance criteria) for that class material specified for that field trip, If the specifications for the carried equipment are available, the process continues to step 375, FIG. 5B. If at step 365, it is determined that the specifications are not available, the process continues to step 370 where a service provider is engaged to invoke a specification service which requires that a model number for that piece of equipment be provided. That is, this step particularly entails generating and sending a specification service request including a model number(s) of the specified class material(s) required for an upcoming class trip. The request is received by the web services 26 and the request is processed by retrieving the requested information data from the appropriate database as indicated at step 373, and further, the specification services response is returned to the end user. Continuing to step 375, FIG. 5B, a determination is made as to whether the equipment specification matches with requirements specified in the class material. Preferably, as will be described, a capability match using semantics would be required, as a keyword match may not be reliable. Then, at step 376, FIG. 5B, a determination is made as to whether a match is found (i.e., the specifications of equipments owned by the user meet the requirements specified for the class purpose). If a match is found, then the student is equipped and the system resumes operation by returning to step 370, FIG. 5A, which step represents engaging a service provider to invoke a specification service to determine the specification of other equipment. Otherwise, the process notifies the end-user that there are equipment deficiencies and recommends an equipment upgrade. The user thus may decide to purchase the equipment upgrade in order to meet the capability requirements of the class as depicted at step 379. That is, as shown at steps 379-389, the user may implement the sequence of like steps 307-325 depicted in the scenario represented in FIG. 4 including: the initiation of a Catalog service request (supply) and retrieval of the appropriate catalog from the database; having the Catalog service respond to the user (step 380); initiating a Purchase order service request (item, quantity, payment info, delivery info); the invoking of a payment service for performing credit checks and a Logistics service for shipping/handling (step 383); generating the appropriate PO service request for receipt by the appropriate suppliers; performing payment service request and logistics service request (step 385); and finally, receiving a PO service response (step 388), including confirmation of payment and delivery logistics, i.e., for shipping and handling. Additionally, although not shown, the service information is supplied to the Sponsor in order to determine the efficiency and compliance with the SLA service performance metrics. The process then proceeds to step 391 which represents the step of repeating the process, if necessary, to determine whether other equipment is required for the field trip scenario.

Thus, in one exemplary scenario, implementing the process depicted in FIGS. 5A-5B, the specifications for a camera portion of a cell phone carried by the subject end user are compared with the task performance criteria related to the production of TIFF output for the field trip assignment as described in the database record 400 of the Class and Assignment database (FIG. 6). Via web services, the system may determine, for example, that the student's digital camera only supports BITMAP, JPG and GIF format. Since the digital camera owned by the student as part of the cell phone does not support the format the class requires, the system notifies the student that s/he should order an upgraded cell phone with a digital camera capable of directly producing TIFF output. In this example scenario, assume that the student accepted the upgrade recommendation and spent the money for the order. If that student later found out that another student was able to use the same original cell phone/digital camera to produce the TIFF output, then that student may use the Rating field 173 shown in the End User Interface 150 shown in FIG. 10 to enter a low rating for this recommended upgrade in rating field 173.

As mentioned in the example system applications described with respect to FIGS. 2-4 and FIGS. 5A-5B, after processing system requests according to the invention, service performance metrics are collected and displayed on the Sponsor's User Interface 100 shown in FIG. 11 and the Service Provider's User Interface 180 shown in FIG. 12. Review of these metrics provide the opportunity for either a mutually agreed upon renegotiation of performance metrics between the sponsor and service provider or a unilateral demand by the sponsor, for example, that the service provider improve performance metrics at no additional cost to the sponsor in order to meet the conditions of the service level agreement (SLA). Accordingly, via the service provider interface 180 as shown on FIG. 12, the service provider has several optional ways to improve the performance metrics agreed upon as part of the service level agreement with the sponsor. With reference to the actual to date metrics 183 indicated in FIG. 12, the service provider can elect to replace that supplier, e.g., Staples, and other suppliers rated as providing less than excellent delivery timeliness, since the current 70% on time delivery metric is below the agreed upon goal of 90% as indicated in the SLA performance metrics goals 184.

In order to improve the actual performance metric related to the accuracy of equipment alerts, as rated by the end users via their interface 150 of FIG. 10, the service provider 25 can optionally invoke several additional services at no expense to the sponsor. For example, the service provider can increase the frequency of alert refreshes, as shown in the in scope services "alert refresh frequency" 108 indicated in the Sponsor User Interface 100 of FIG. 11, in order to better match reminders and upgrade recommendations provided to students with up to date task performance requirements provided by instructors who may modify class requirements within days of a class assignment. Additionally, the service provider 25 can, at no additional charge to the sponsor, provide task performance tips to students which might eliminate unnecessary equipment upgrade recommendations. This service would optionally require that task efficiency performance monitoring be agreed upon by each student with data summarized in a record 475 in the Student Task Efficiency Performance Database shown in FIG. 8 and collected using techniques known to skilled artisans. For example, slow performance by a student assigned the task of writing an essay could be due to a lack of knowledge of available essay creation templates. Providing a tip on these available word processing templates might eliminate a possible recommendation to upgrade application software, add memory to an active device, or other recommendations which would cause the student to incur expense without providing the specific task performance tip needed.

As mentioned, an optional service which the service provider could invoke in an attempt to improve the actual performance metric related to the accuracy of equipment alerts would be the use of semantic-based capability matching for recommended upgrades. This is illustrated by a variant of the Field Trip Scenario whose flow steps are depicted in FIGS. 5A and 5B. The steps involved with the use of the semantic-based capability matching are illustrated in FIG. 9.

First, referring back to FIG. 6, the example Class and Assignment database records indicate that TIFF format is required for digital photographs taken of a pond during a field trip to the environmental center. As described earlier, without the use of the semantic-based capability matching, a cell phone upgrade recommendation may be erroneously provided by the system and would result in a low accuracy rating by the student once he/she found out that a colleague was able to produce TIFF output from the identical digital camera/cell phone combination. As shown in FIG. 9, at a first step 80, an active device initiates semantic-based matching between the class requirement and the equipment specification if semantic-based capability matching is one, of the optional services selected via field 187 of the service provider interface of FIG. 12. Thus, as shown at steps 83 and 85, the matching algorithm retrieves the respective class requirement specifications and the equipment specifications. Then, as indicated at a step 90, the matching algorithm queries the semantic model 99 which invokes a taxonomy or ontology for use in semantic-based matching. Semantic-based matching is known as one of the most widely used applications of ontology with details regarding such applications found in the reference entitled "Ontologies Come of Age" Deborah L. McGuinness published by MIT Press, 2001 appearing in "The Semantic Web: Why, What, and How" (Dieter Fensel, Jim Hendler, Henry Lieberman, and Wolfgang Wahlster, editors).

Figure 9:
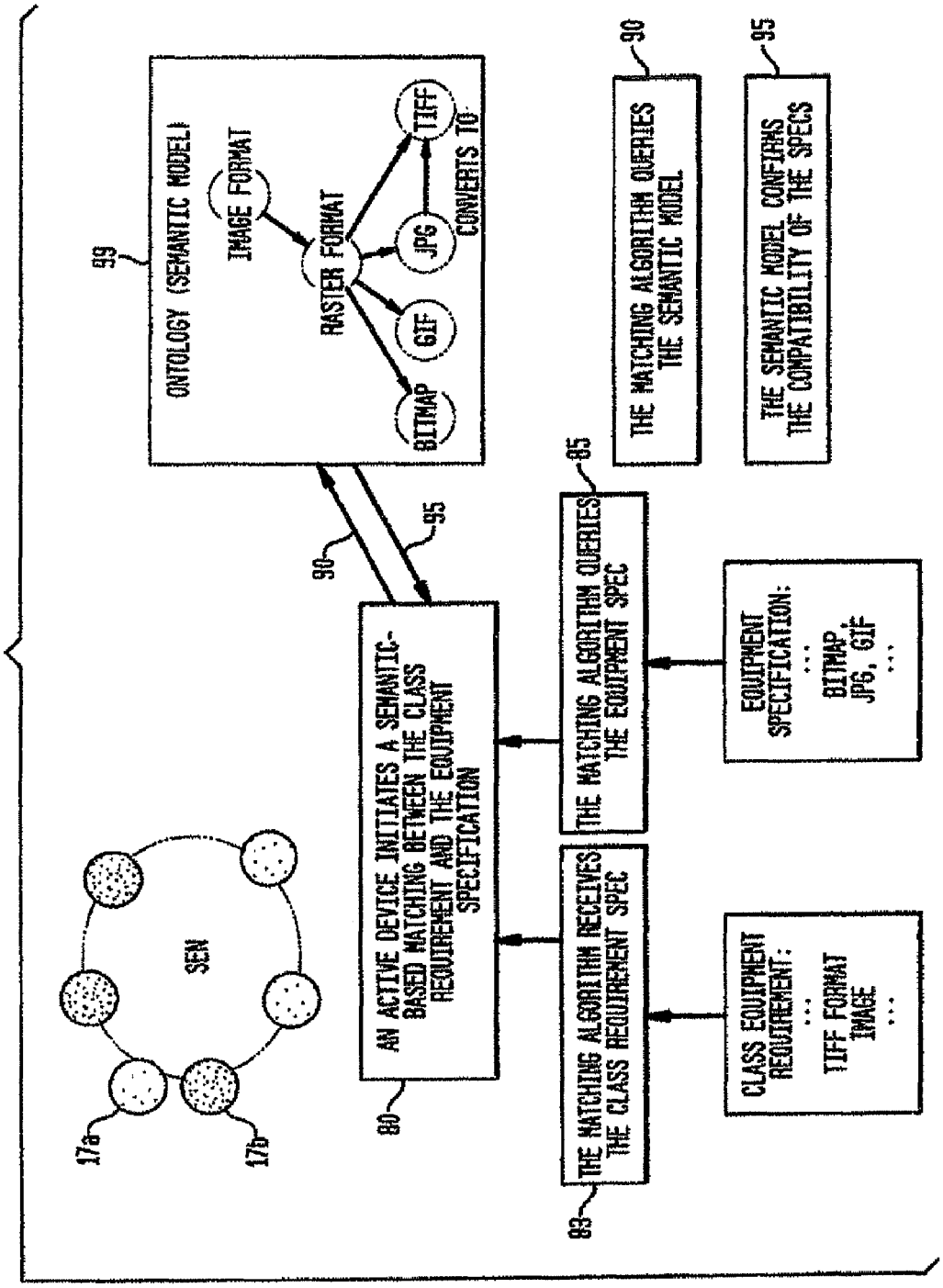
FIG. 9 is a graphical depiction showing the steps involved with the use of the semantic-based capability matching technique according to the invention.

Thus, in the example scenario depicted in FIG. 9, the taxonomy or ontology invoked by the semantic-based matching confirms that TIFF and JPG, both belong to the same raster image format family. Further, the ontology confirms that the student can convert a picture in JPG to one in TIFF by using one of the available web services. Seemingly, the digital camera owned by the student does not support the format the class requires, but, by using the semantic-based capability matching of the subject invention, the student is notified that s/he does not need another camera for the task. This is because, at step 95, FIG. 9, the semantic model had confirmed the compatibility of the specifications. As a result the student saves money and provides a high rating value in the entry via their interface 150 in FIG. 10 to the equipment alert that the currently available web services can convert camera output format to the required TIFF format.

Thus, the semantic-based capability matching service is invoked where there is a mismatch between the equipment capabilities specified in FIG. 6 (Class and Assignment database) for a specific assignment and the equipment capabilities described in the Student Equipment and Notification Channel database shown in FIG. 7 and, is not invoked in cases where the student is missing equipment needed for a class assignment. In this situation, one of the active devices in the SEN invokes a web service "spec service request" which checks a specification database as shown at steps 370, 373 in FIG. 5A. If the optional semantic based matching service is not part of the SLA, a mismatch results in a recommended equipment upgrade order as indicated at step 376, FIG. 5B. If the optional semantic-based matching service is part of the SLA, a mismatch causes one of the active devices in the SEN to initiate the semantic based matching web service request.

It should be understood that in one embodiment, the semantic-based capability matching may be a web service from the Internet. Alternatively, or in addition, semantic-based capability matching functionality may be a service within the SEN shared only by the students using the SEN. Alternative embodiments providing as a personal service setup for semantic matching is also contemplated. The semantic-based capability matching functionality may be provided by the system's service provider, by the sponsor, or by a third party under contract to the service provider.

It should be understood that the SEN has many other additional capabilities. For example, it may interface to supply chains to invoke reordering of needed student equipment via a web service interface (e.g., to Staples). The student (or third party) in the SEN may receive notifications to ensure that student has all the necessary equipment and configured for the current task. The notification may concern upgrades to some components of their SEN of devices or, of new products that could replace their current inventory and her improve their productivity. The notification may include instructions about how to perform certain tasks more efficiently using the existing components or by upgrading one or more components.

While the invention has been particularly shown and described with regard to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A system for monitoring availability of end user devices needed for performing a task, said system comprising:
  a memory;
  a processor in communication with said memory, wherein the system is configured for performing a method comprising:
  providing, in a first network comprising one or more active and passive devices associated with an end user, each said one or more active and passive end user devices associated with a Radio Frequency Identification (RFID) tag, at least one end user active device adapted for communicating with a service provider via a second network and said passive end user device not having computing capability, said service provider providing network-based services in said system;

maintaining information of tasks associated with an end user, said information including recommended passive end-user devices adapted to perform said tasks, said tasks information provided to at least one end-user device by said service provider, said maintained information including recommended performance criteria associated with each passive device sufficient for performing end-user tasks, said comparing further comparing a configuration of a passive end-user device associated with a task with said recommended performance criteria; and, detecting, by at least one end-user device, non-availability or performance deficiencies of said one or more active and passive end-user devices required in performing end-user tasks by scanning said RFID tags, wherein said communicating with a service provider comprises generating signals for invoking network-based services via said second network to facilitate correcting non-availability of any end-user passive device, said detecting comprising:

comparing a current inventory of devices associated with a particular end user with said recommended end user passive devices adapted for performing said tasks for said end user; and, generating, by said at least one active end user device, signals for receipt by a service provider for invoking network-based services via said second network to facilitate correcting non-availability of or correcting deficiencies of any end user passive device detected by scanning said RFID tags, said service provider further communicating with said at least one user active device over said second network to provide notification to an-end user about a required passive device for task assignments to be performed and, to provide notification to an end user about correct settings for a passive device having an adjustable component to enable completion of a task assignment, wherein said at least one end user active device is responsive to said signals for initiating adjustment of said at least one adjustable component.

2. The system as claimed in claim 1, wherein said signals generated for invoking network-based services via said second network comprise one or more of service requests to request a catalog, generate a purchase order, and provide for payment and logistic service requests to replenish or upgrade devices in said system.

3. The system as claimed in claim 2, wherein said service provider provides network-based services including W3C-specified web services according to an XML standard.

4. The system as claimed in claim 1, wherein said comparing further comprises performing a semantic based capability matching of said recommended performance criteria and said end-user device performance configuration.

5. The system as claimed in claim 1, wherein said second network comprises one or more of an Internet, an intranet, an enterprise intranet, a public switched telephone network (PSTN).

6. The system as claimed in claim 1, comprising a database for maintaining information of tasks associated with an end user and recommended end-user devices, said database accessible by a service provider.

7. The system as claimed in claim 1, wherein said service provider communicates with said at least one user device over said second network to provide notification to an end-user about required or unnecessary devices for task assignments to be performed.

8. The system as claimed in claim 1, wherein said service provider communicates with said at least one user device over said second network to provide notification to an end-user about hardware or software upgrades for said devices to enable completion of said task assignments in accordance with associated task performance criteria.

9. The system as claimed in claim 1, wherein said first network comprises a wireless communications network, each said active device adapted to communicate among said active devices and an external device, and each said active device and passive device having a unique identifier associated therewith.

10. The system as claimed in claim 9, wherein said one or more passive devices comprises sensors for identifying said device by an active device, said system further monitoring availability and configuration of said passive devices via said sensors.

11. The system as claimed in claim 9, wherein said unique identifier comprises one of: an IP address, a phone number, a serial number, an alphanumeric string, an RFID tag.

12. The system as claimed in claim 9, wherein said communications among said active devices and an external device is according to one of: a Bluetooth, IEEE 802.11 protocol.

13. The system as claimed in claim 1, wherein said first network comprises a network of educational equipment, said end users being students of an educational system and said end user devices comprise devices for use in an educational setting.

14. A method for monitoring availability of end user devices needed for performing a task comprising:

providing at least one active device of a first network of one or more active and passive end user devices associated with an end user with capability for communicating with a service provider via a second network, a said passive end user device not having computing capability, each said one or more active and passive end user devices associated with a Radio Frequency Identification (RFID) tag, said service provider providing network-based services;

maintaining information of tasks associated with an end user and recommended end user devices adapted to perform said tasks, said information including recommended passive end-user devices adapted to perform said tasks, said tasks information provided to at least one end-user device by said service provider, said maintained information including recommended performance criteria associated with each passive device sufficient for performing end-user tasks, said comparing further comparing a configuration of a passive end-user device associated with a task with said recommended performance criteria;

receiving signals by said at least one end user device that indicate said tasks and recommended passive or active end user devices information for a particular end user; and, detecting, by at least one end-user device, non-availability or performance deficiencies of said one or more active and passive end user devices used in performing end user tasks by scanning said RFID tags, said detecting comprising:

comparing a current inventory of devices associated with a particular end user with said recommended end user passive devices adapted for performing said tasks for said end user; and, generating, by said at least one active end user device, signals for receipt by a service provider for invoking network-based services via said second network to facilitate correcting non-availability of or correcting deficiencies of any end user passive device detected by scanning said RFID tags, said service provider further communicating with said at least one user active device over said second network to provide notification to an-end user about a required passive device for task assignments to be performed and, to provide notification to an end user about correct settings for a passive device having an adjustable component to enable completion of a task assignment, wherein said at least one end user active device is responsive to said signals for initiating adjustment of said at least one adjustable component.

15. The method as claimed in claim 14, wherein said comparing further comprises: performing semantic based capability matching of said recommended performance criteria and said end-user device performance configuration.

16. The method as claimed in claim 14, further comprising enabling said service provider to communicate with said at least one user device over said second network to provide notification to an end-user about required or unnecessary devices for task assignments to be performed.

17. The method as claimed in claim 14, further comprising enabling said service provider to communicate with said at least one user device over said second network to provide notification to an end-user about hardware or software upgrades for said devices to enable completion of said task assignments in accordance with associated task performance criteria.

18. A computer program product comprising a non-transitory computer usable medium having a computer usable program code for monitoring availability of end user devices needed for performing a task, said computer program product comprising:

computer readable program code for providing at least one active device of a first network of one or more active and passive end user devices associated with an end user with capability for communicating with a service provider via a second network, a said passive end user device not having computing capability, each said one or more active and passive end user devices associated with a Radio Frequency Identification (RFID) tag, said service provider providing network-based services;

computer readable program code for maintaining information of tasks associated with an end user and recommended end-user devices adapted to perform said tasks, said information including recommended passive end-user devices adapted to perform said tasks, said tasks information provided to at least one end-user device by said service provider, said maintained information including recommended performance criteria associated with each passive device sufficient for performing end-user tasks, said comparing further comparing a configuration of a passive end-user device associated with a task with said recommended performance criteria;

computer readable program code for receiving signals by said at least one end user device that indicate said tasks and recommended passive or active end user devices information for a particular end user; and, computer readable program code for detecting, by at least one end-user device, non-availability or performance deficiencies of said one or more active and passive end user devices used in performing end user tasks by scanning said RFID tags, said detecting comprising:

comparing a current inventory of devices associated with a particular end user with said recommended end user passive devices adapted for performing said tasks for said end user; and, generating, by said at least one active end user device, signals for receipt by a service provider for invoking network-based services via said second network to facilitate correcting non-availability of or correcting deficiencies of any end user passive device detected by scanning said RFID tags, said service provider further communicating with said at least one user active device over said second network to provide notification to an-end user about a required passive device for task assignments to be performed and, to provide notification to an end user about correct settings for a passive device having an adjustable component to enable completion of a task assignment, wherein said at least one end user active device is responsive to said signals for initiating adjustment of said at least one adjustable component.

19. The computer program product as claimed in claim 18, wherein said computer readable program code for comparing further comprises: computer readable program code for performing semantic based capability matching of said recommended performance criteria and said end-user device performance configuration.

20. The computer program product as claimed in claim 18, further comprising computer readable program code for enabling said service provider to communicate with said at least one user device over said second network to provide notification to an end-user about required or unnecessary devices for task assignments to be performed.

21. The computer program product as claimed in claim 18, further comprising computer readable program code for enabling said service provider to communicate with said at least one user device over said second network to provide notification to an end-user about hardware or software upgrades for said devices to enable completion of said task assignments in accordance with associated task performance criteria.

22. A network-based system for maintaining currency of equipment used by end users for performing tasks, said system comprising:

a memory;

a processor in communication with said memory, wherein the system is configured for performing a method comprising:

receiving, at a computing service provider entity, requests from an active end user device via a network for specific task assignment details for an end user, and required passive devices and related settings associated with said task, said computing service responsive to said received requests for providing said details to said end user device via said network;

determining in real-time whether the equipment required for a specified task is currently available and have settings sufficient to perform said task for said end user, and generating notification to an end-user if said passive device is currently unavailable or not sufficient for performing said task via a user interface associated with an end user device, wherein, via said user interface, an end user invokes a computing service via said network, said computing service adapted for correcting non-availability of or correcting deficiencies of any end user passive device and, providing notification to said end user about correct settings for a passive device having an adjustable component to enable completion of a task assignment, said end user active device responsive to said notification for initiating adjustment of said at least one adjustable component.

23. The system as claimed in claim 22, wherein said computing service includes service requests and responses for providing a catalog provided by an equipment supplier.

24. The system of claim 22, wherein said computing services includes service requests for providing and generating a purchase order for said equipment.

25. The system of claim 22, wherein said computing services includes service requests for coordinating payment and equipment delivery to an end user.

26. The system of claim 22, further comprising a sponsor entity for contracting with said computing service provider entity for said service level agreements on behalf of groups of users, said computing service provider entities guaranteeing performance of said networked equipment according to said service level agreements.

* * * * *